Fig.9
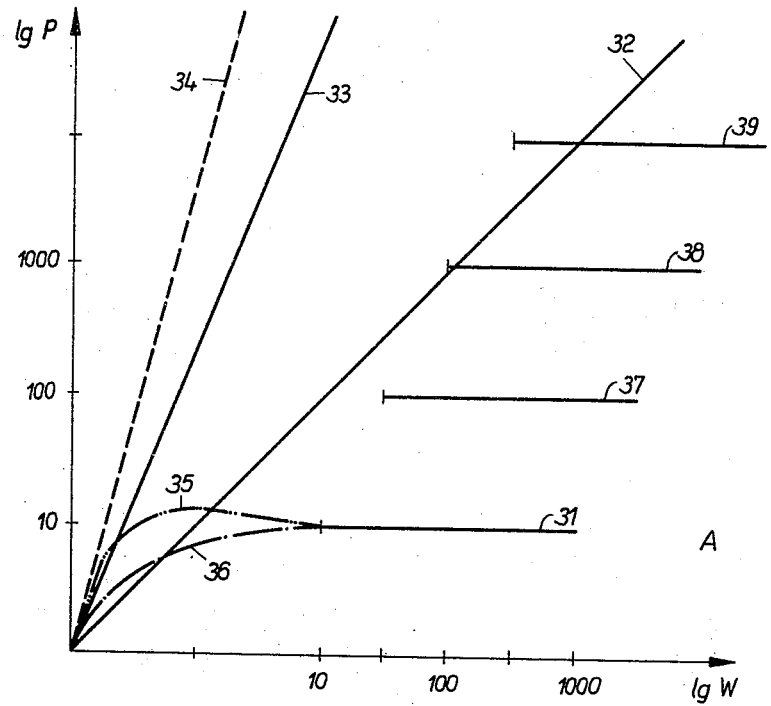
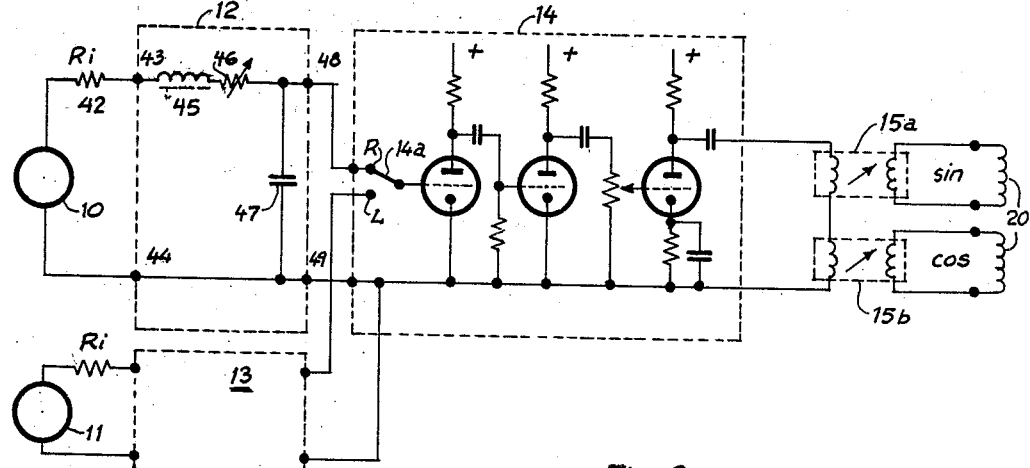
Fig. 3.

United States Patent Office 3,151,485
Patented Oct. 6, 1964

3,151,485
APPARATUS FOR INTEGRATION OF ELECTRICAL MEASURING VALUES, PARTICULARLY ON A BALANCING MACHINE
Klaus Federn and Otfrid Maus, Darmstadt, Germany, assignors to Carl Schenck Maschinenfabrik G.m.b.H., Darmstadt, Germany, a corporation of Germany
Filed Aug. 8, 1961, Ser. No. 130,163
Claims priority, application Germany, Aug. 12, 1960, Sch 28,316
10 Claims. (Cl. 73—462)

Our invention relates to apparatus for the double integration of electrically measured values which occur as alternating voltages, particularly at the transducers that respond to the vibratory forces or displacements due to unbalance of a workpiece rotating in the bearings of a balancing machine.

The unbalance-responsive voltages furnished by such transducers or pickups of balancing machines are proportional to the square or cube of the speed of workpiece rotation. Such a dependency of measuring values upon the rotating speed is undesirable, especially if the workpiece is to be balance-tested or balanced over a relatively great range of rotating speeds. As a rule, it is preferable to obtain a measuring indication independent of the rotating speed or, in some cases, a characteristic that increases in linear proportion to the rotating speed because rotors that are to rotate at higher speeds must usually be balanced at correspondingly increasing accuracy. In the latter case, the linear measuring characteristic affords for any speed the proper adaptation in measuring sensitivity.

A quadratic or cubic dependency of the measuring sensitivity upon the rotating speed of a workpiece is unfavorable because slight fluctuations in speed may already cause sensitivity variation of doubled or tripled magnitude so that it is difficult to preserve a required read-out tolerance, for example 5%, with respect to the unbalance amount being measured. Furthermore, the occurrence of elastic deformation at the rotor becomes extremely difficult to detect with such a quadratric or cubic dependency. A quadratic or cubic increase in sensitivity is also unfavorable if the rotor to be balanced must be journalled in the balancing machine by roller bearings or on supporting rollers. Such journalling means may cause superimposed high-frequency disturbances which affect the measuring devices with the above-mentioned increased sensitivity so that they may greatly impair the accuracy of the measuring results.

To obtain electric measuring values of the described more favorable properties with respect to the rotating speed of a rotor, it has been proposed to provide for integration of the alternating voltage generated in response to the vibrations of the journalling means in a balancing machine. Known for this purpose is an integrating device in which the anode resistances of two sequential amplifier stages with parallel connected capacitors is used for double integration.

For performing an integration of sufficient accuracy known devices always require a certain ratio between the magnitude of input voltage and output voltage. In order to attain an accuracy of a few angular degrees over two integrating stages, voltage losses up to 1:2000 must be taken into account, because the voltage losses of the individual integrating stages becomes multiplied with each other. The fact that these integrating stages are combined with respective amplifiers does not do away with the occurrence of these losses. However, undesired disturbance voltages, shot effect noises, hum voltages and spurious pulse voltages are undesirably augmented by the high amplification required. With a sufficiently low natural frequency of the amplifier tube circuits, the noise and emission fluctuations of the amplifier tubes may also become indicated at the output of the integrator.

It is an object of our invention to devise a rotor balance analyzing electric system which secures the desired sensitivity characteristic by voltage integration, but which avoids the above-described disadvantages without requiring an increase in the number of amplifying stages or entailing an excessive amount of expenditure in material and circuitry.

We have discovered, in accordance with our invention, that in these respects, it is particularly advantageous if a resonance circuit of the second order is interposed between the transducer and the measuring instrumentalities of the balance-analyzing system for rendering such a system capable of twice integrating the unbalance-responsive voltages occurring in balancing machines. Suitable as such resonance circuits are a variety of tank circuits which, fundamentally known as such, have an inductance and a capacitance connected in series with each other to the terminals of the vibration pickup or other transducer, and which are tuned to a frequency below the desired lowest working frequency of the system, the output voltage of the integrating system portion being taken from across the capacitance of the resonance circuit and impressed, preferably through an amplifier, upon the measuring portion of the system.

Another, more specific object of our invention is to provide for such a dimensioning of the ohmic resistances in the circuits as to obtain an attenuation resulting in a given desired output voltage of the integrating system portion, with smallest possible phase errors or smallest possible amplitude errors.

Another object of the invention is to afford adapting the electric properties of the voltage integrating portion in the balancing system to the particular operating conditions of the balancing machine so as to reduce the ratio of undesired spurious oscillations to the useful output voltage.

To achieve these further objects, and in accordance with another feature of the invention, we provide the above-described resonance circuit of the system with selective control means for increasing or reducing the capacitance value in order to obtain a controlled weakening of the integrated voltage while simultaneously displacing the natural frequency of the resonance circuit toward lower or higher frequency values respectively.

According to another, more specific feature of the invention, the just-mentioned controlled change in integrated voltage is obtained by increasing or reducing the inductance value and, if desired, also the attenuation value in the resonance circuit, thus obtaining the above-mentioned change in resonant frequency.

According to a further feature of the invention, we combine a resonance circuit of the above-described type with a Miller integrator. Such a combination is of advantage if the balance-analyzing system is to be also applicable in case where only a simple integration is required.

For this purpose, and in accordance with a more specific feature of our invention, the capacitance of the above-described resonance circuit is designed as a fictitious input (feedback) capacitance of an amplifier circuit, for example of a known Miller integrator, and a selector switch is provided with whose aid the unbalance-responsive pickup voltage can be impressed either upon the resonance circuit if a double integration is desired, or upon the Miller integrator if a simple integration is preferred.

The invention will be further described with reference to the embodiments illustrated schematically and by way of example on the accompanying drawings in which:

FIG. 3 is a schematic circuit diagram of the electric system that forms part of the machine.

FIGS. 7, 8 and 9 are explanatory graphs relating to the performance of an integrating balance-analyzing system according to the invention.

Figure 1:
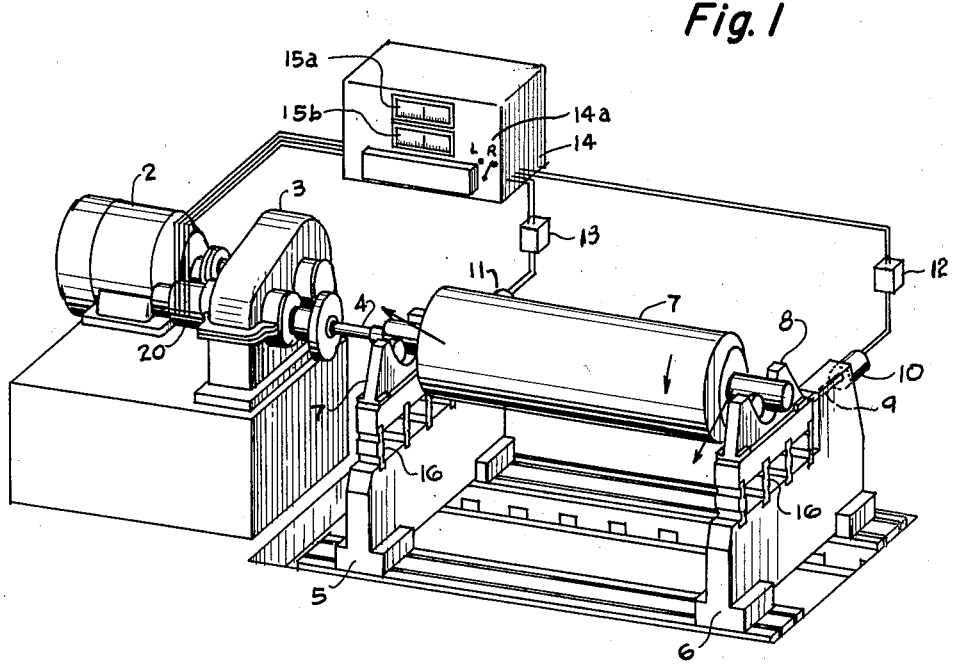
FIG. 1 shows schematically and in perspective a balancing machine equipped with a balance-analyzing electric system according to the invention.

According to FIG. 1, a rotor 1 to be balanced is driven from a motor 2 through a step-down gearing 3 and a cardanic connecting shaft 4. The rotor is journalled on two bearing supports 5 and 6 whose respective bearing bridges 7 and 8 are supported on leaf springs 16 so as to be capable of horizontal oscillations in respective vertical planes extending in radial relation to the rotor axis. The bearing bridges 7 and 8 are connected by respective rods 9 (FIG. 2) with respective electrodynamic pickups 10 and 11. When the rotor 1 is rotating at the proper testing speed, any unbalance of the rotor causes the bearing bridges 7 and 8 to oscillate. Corresponding alternating voltages are then generated in the respective pickups 10 and 11. These voltages, having the same frequency as the rotor rotation, are impressed upon respective electric circuit devices 12, 13 (FIGS. 1, 3) which operate as double integrating networks as will be more fully explained below. Each integrated voltage is supplied to an amplifying device 14 whose output voltage is supplied to two indicating instruments 15a, 15b of the wattmeter type. Also driven from the motor 2 in synchronism with the rotor 1 is a phase generator 20, for example a dynamo, which furnishes two alternating voltages 90° phase-displaced from each other and preferably of sinusoidal wave shape. These sine and cosine voltages, having a frequency corresponding to that of the rotor rotation, are likewise supplied to the two instruments 15a and 15b for determining the angular position of unbalance, or for determining two correlated (Cartesian) components of unbalance in each of the two reference planes correlated to the respective pickups.

The indicating instruments 15a, 15b may consist of conventional wattmeters whose fixed (current) coils are excited by the sine voltage and cosine voltage respectively, whereas the integrated voltages, stemming originally from one of the two pickups 10 and 11, are supplied to the moving (voltage) coil of each instrument. In this manner, the alternating voltage generated by either pickup in response to unbalance oscillations of the rotor, upon integration in the integrator 12 or 13 and amplification in the amplifier 14, is converted into two component voltages which are 90° phase-displaced from each other and are indicated by the respective instruments 15.

By means of a switch 14a (FIGS. 1, 3), the amplifier 14 can be selectively connected to the pickup 10 or the pickup 11 in order to sequentially perform a balance-analyzing operation for the two reference planes.

Figure 2:
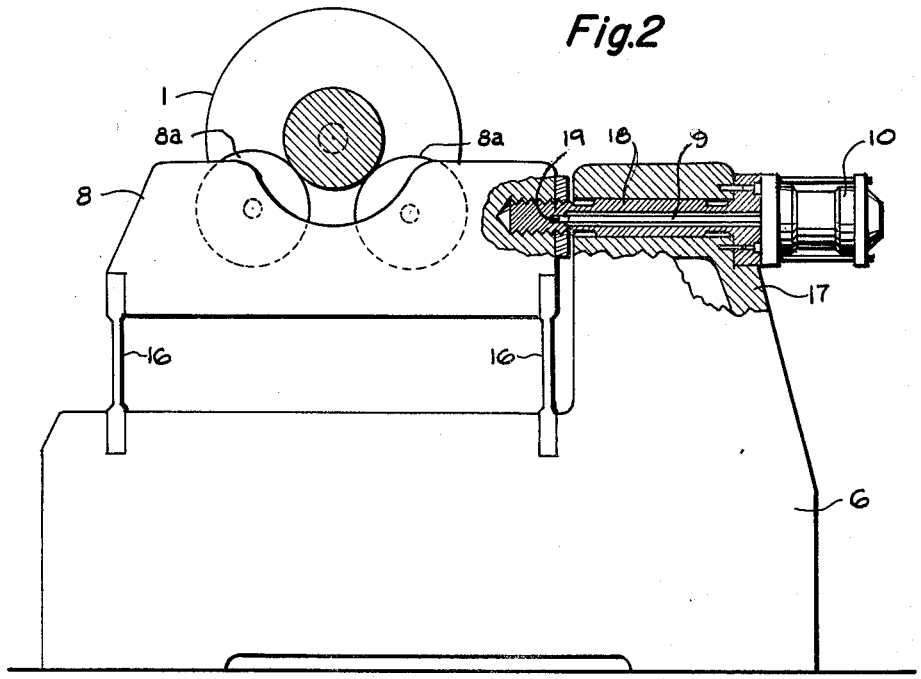
FIG. 2 is a part-sectional side view of one of the journalling bridges and pickups of the same machine.

As shown in FIG. 2 for the bearing support 6 of the machine, the leaf springs 16 which support each of the bearing bridges are rather strong and relatively rigid, and are fastened to the housing portion 17 of the support structure 6. The unbalance force generated by the rotation of the rotor 1 and transmitted to the bridge structure 6 by bearing rollers 8a is transmitted by a tube 18 to the housing structure 17. This causes the tube 18 to become elastically deformed. The transmission rod 9 is joined with the tube 18 at point 19 and transmits such deformation to the electrodynamic oscillation pickup 10 which furnishes an alternating voltage proportional to the magnitude of the unbalance force. The particular pickup and its mounting used in the illustrated embodiment and described above is in accordance with the copending application of Klaus Federn, Serial No. 88,139, filed February 9, 1961 for Oscillatory Force Sensing Device for Rotor Balancing and other Oscillatory Machines, assigned to the assignee of the present invention.

In FIGS. 1 and 3, the selector switch 14a is shown set to position R for indicating the unbalance in the right reference plane. With this setting of switch 14a, only the pickup 10 with the appertaining resonance circuit 12 still to be described is connected through the amplifier 14 with the respective moving coils of the two wattmeters 15a and 15b whose respective fixed coils are energized by sine and cosine currents respectively from respective windings of the phase-reference generator 20. With the rotor rotating at proper speed, the instrument 15a will then indicate one component of unbalance, for example the "vertical" component, and the instrument 15b will simultaneously indicate the other component, i.e. the "horizontal" component of unbalance in the right reference plane, in accordance with the known two-component measuring principle. When the switch 15a is set to position L, the pickup 10 is disconnected from the amplifier 14, and the pickup 11 with the appertaining resonance network 13 is connected through amplifier 14 with the wattmeter instruments 15a and 15b, so that these instruments now indicate the two components of unbalance in the left reference plane.

As mentioned, the transducers or pickups also generate spurious voltages which become superimposed upon the unbalanced-responsive voltage and are apt to falsify the measuring result particularly in view of the fact that, in the known balance-measuring systems, these higher-frequency voltages are responded to in accordance with the square or third power of the rotating speed of the workpiece. In wattmetric systems, the wattmeter instruments moderate the effect of such spurious voltages; but the ever increasing demands for higher rotating speeds of the workpieces, such as dynamoelectric gyroscopic or other rotors, and the likewise more exacting accuracy requirements now often to be met, make it more and more important to obviate the disturbing effects of spurious voltages, and this, if done according to the prior art, would require a considerable expenditure in circuitry and cost of rather intricate filtering means involving substantial energy losses. This applies to an even greater extent to the known balancing system of the non-wattmetric types.

As explained, however, the just-mentioned difficulties are greatly minimzed by virtue of the voltage-integrating series-resonant tank circuit 12, 13 inserted between each transducer 10, 11 and the measuring portion proper of the system. One of these integrator circuits is separately illustrated in FIG. 4 and will be more fully explained presently.

Figure 4:
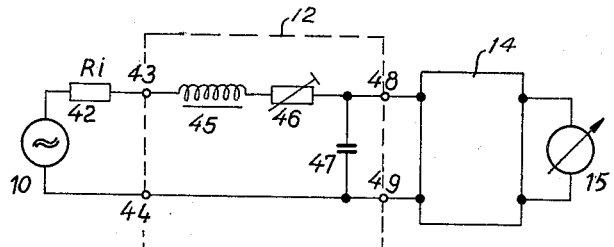
FIG. 4 shows separately the circuit diagram of one of the resonance circuits that form part of the system according to FIG. 3.

In FIG. 4, as well as in FIG. 3, the pickup 10 constitutes the alternating-voltage source of the resonance circuit. Shown connected in the output circuit of source 10 is an ohmic resistor 42 which constitutes the inner resistance $R_i$ of the voltage source. The source is connected through resistor 42 to the input terminals 43 and 44 of a resonance circuit of the second order, consisting essentially of an inductivity member 45 with its ohmic resistance 46, and a capacitance member 47. The integrated voltage is taken from the output terminals 48 and 49 of the resonance circuit, this integrator output voltage being the one obtaining across the capacitor 47. As described, the integrated voltage is applied through an amplifier 14 to indicating means, only one indicating instrument 15 being schematically shown in FIG. 4.

Figure 5:
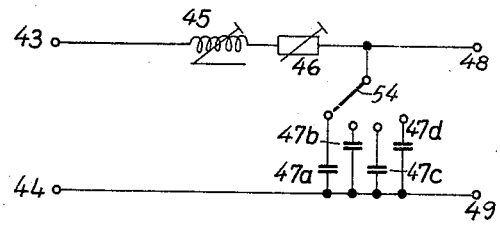
FIGS. 5 and 6 illustrate two different modifications respectively based upon the circuit diagram of FIG. 4.

FIG. 5 shows separately the portion of the resonance circuit between the input terminals 43, 44 and the output terminals 48, 49. As shown, the capacitance of the resonance circuit is made variable by providing a selector switch 54 which permits connecting one of a number of capacitors 47a to 47d with the inductivity 45 of the circuit, the inductance value of this inductivity being continuously variable. The capacitor 47 according to FIG. 4 may also remain connected in the circuit shown in FIG. 5 in which case the additional capacitors are selectively connected in series or parallel relation to the capacitor 47. The magnitude of the additional capacitors thus to be selectively connected into the circuit is preferably predetermined by calculation or empirically in accordance with the balancing requirements to be met. Such adaptation is effected, for example, so that the resonance frequency is lower than 50% of the lowest frequency of rotor rotation at which the unbalance is to be measured, or corresponding to the graduation in rotating speeds of the gearing 3 (FIG. 1) if this gearing has several stages, or in accordance with FIG. 8 as explained below.

Figure 6:
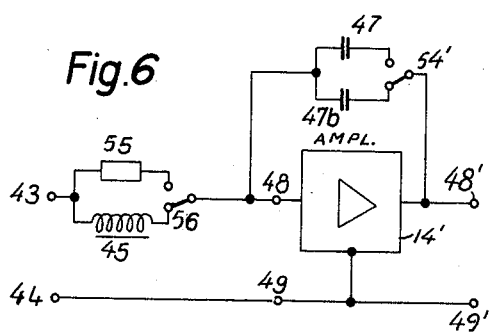

In the illustration of a modified circuit shown in FIG. 6, the same respective reference numerals are used for the same components as in FIGS. 4 and 5. An additional ohmic resistor 55 is provided. A selector switch 56 permits connecting either the inductivity 45 or the resistor 55 in series with one of the capacitors 47a, 47b. Another switch 54' permits selectively connecting one of the respective capacitors 47a, 47b to one of the output leads of an amplifier 14'. This has the effect that at the terminal 48' a fictitious or simulated capacitance is maintained which is equal to the product of the natural capacitance, for example that of capacitor 47b, times the amplifying factor of amplifier 14'. The selected capacitor 47a or 47b constitutes a feedback which imparts to the amplifier circuit a linear characteristic simulating the linear portion of the characteristic exhibited by a comparatively very large capacitance. The Miller integrator, constituted by components 14', 47a or 47b in the connection shown, thus acts as an entity like the integrating capacitor 47 in FIG. 4.

The performance of the apparatus according to the invention will be explained with reference to FIGS. 7 to 9. Impressed upon the input terminals 43, 44 of the resonance circuit is the voltage $U_1$ generated by the periodic unbalance forces. At the output terminals 48, 49 of the resonance circuit, across the capacitance 47, there appears the twice integrated voltage $U_0$ which is supplied to the measuring portion 14, 15 of the balance-analyzing system.

Figure 7:
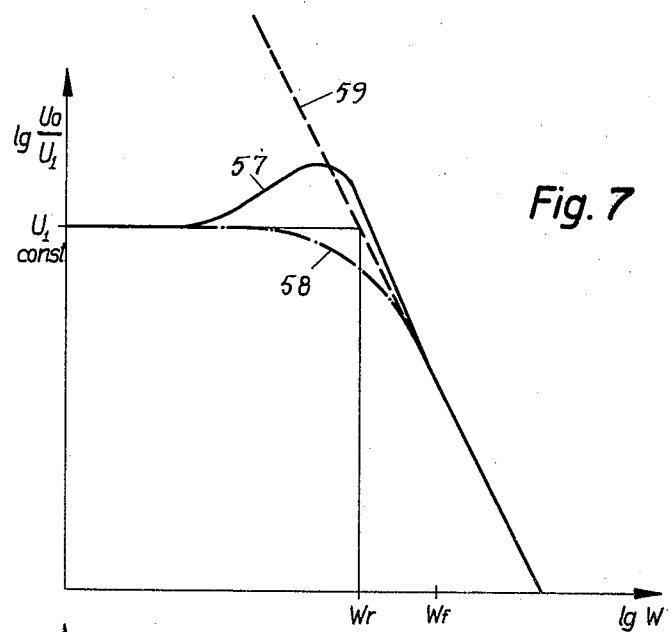

The graph in FIG. 7 shows voltage (U) versus angular frequency ($\omega$), both on a logarithmic scale. It is apparent from the graph how the output voltage $U_0$ behaves as a function of the frequency $\omega$ when the amplitude of the input voltage $U_1$ is kept constant. Commencing from the frequency zero value, the output voltage $U_0$ at first has a constant amplitude which may show a maximum at the resonance frequence $\omega_r$. Depending upon the dimensioning of the resistors 42 and 46 (FIG. 4) relative to the inductivity 45, one obtains, for example, the curve 57 for relatively low attenuation (damping) of the resonance circuit, and the curve 58 for the larger attenuation. The straight line 59 represents the desired course of the output voltage of a perfect double-integration circuit. It will be recognized that this linear course is attained already in the immediate vicinity of $\omega_r$. Toward lower frequencies, however, a further increase in output voltage is always undesirable so that the coincidence of curves 57 and 58 with the constant value $U_1$ is a considerable advantage of circuitry according to the invention.

Figure 8:
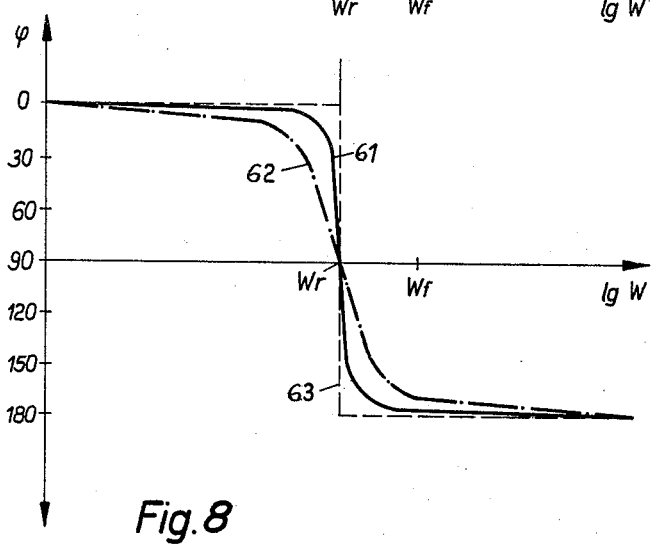

The graph of FIG. 8 represents the corresponding phase error curves. The ordinate indicates the phase error $\varphi$ in angular degrees, and the abscissa indicates the angular frequency $\omega$ on a logarithmic scale corresponding to the one used on the abscissa of FIG. 7. Curve 61 in FIG. 8 corresponds to curves 57 in FIG. 6, curve 62 corresponds to curve 58 in FIG. 6, and the straight line 63 in FIG. 8 corresponds to line 59 in FIG. 6. It will be recognized that, although the curve 61 has the smallest phase error, its amplitude exhibits a slight increase in output voltage. At an only slight distance of the lowest working frequency $\omega_t$ from the resonance frequency $\omega_r$, however, the desired slight phase departure from the ideal straight line 63 is readily obtained.

In FIG. 9, the abscissa denotes angular frequency $\omega$ and the ordinate denotes unbalance force P, both on logarithmic scales. The graph shows different characteristics of unbalance indication obtained with conventional balancing machines. The straight line 31 applies to the case in which the indication of unbalance of an inherently rigid rotor is independent of the rotary speed, so that the sensitivity of unbalance indication is constant. Such an indication makes it unnecessary to recalibrate or readjust the unbalance-analyzing system for the particular rotating speed if the balancing machine must be operated at different rotor speeds or at continuously variable speeds.

The curve 32 relates to pickup sensitivity which increases with the speed of rotation presented on a log-log coordinate system, constituting a straight line inclined at an angle of 45°. Such a characteristic is exhibited by balancing machines of low frequency tuning which perform a supercritical unbalance-measuring operation by means of electrodynamic moving-coil pickups in combination with a phase-reference transmitter independent of the rotating speed, and a wattmetric measuring instrument.

Curve 33 relates to pickup sensitivity that increases with the square of the rotating speed, such a characteristic being peculiar to balancing machines that are tuned to a high frequency and effect a balance-measuring operation under subcritical conditions by means of piezoelectric transducers. A characteristic of the same type is exhibited by balancing machines of low frequency tuning with a supercritical unbalance-measuring operation by means of the above-mentioned moving-coil pickups, inductive phase-reference transmitters and wattmeters. Curve 34 indicates a sensitivity increasing with the third power of the rotating speed. It applies to certain high-frequency tuned balancing machines with a subcritical unbalance indication at a wattmeter, employing moving-coil pickups that are responsive to oscillatory forces occurring at special dynamometers, and using speed-independent phase-reference transmitters.

Based upon the curve 33 (square-law dependency) in FIG. 9, it will now be explained how by virtue of the invention an output voltage independent of the rotating speed of the rotor is obtained by double integration of the pickup voltage. As mentioned, the graph of FIG. 7 refers to a constant input voltage. If one redraws this graph for a constant output voltage 31 (FIG. 9), the resulting curves will correspond to those shown at 35 and 36 in FIG. 9. Assume, for example, that the curves 35 and 36 in FIG. 9 thus correspond to the curves 57 and 58 in FIG. 7 and are in accordance with different attenuation values of the integration circuit. If a greater indicating sensitivity at higher rotating speeds is desired, then it is possible to shift the natural frequency of the integrating circuit toward higher frequencies by varying the magnitude of the capacitance, which simultaneously results in increasing the output voltage. The output voltage of curve 31 at low tuning would then be displaced into the output curves 37, 38 or 39 at respectively higher frequencies. A given permissible maximum of unbalance indication can be coordinated to each of these sensitivity stages. In this manner, any damage to the rotor or to the rotor journals in the balancing machine by excessively large unbalance forces can be avoided. The lower limit of these ranges in each case is given by the required accuracy of indicating. The particular advantage of such apparatus according to the invention resides in the fact that relatively large losses, such as those occurring in the heretofore known two-stage integration circuits, are almost fully avoided.

The circuits described above with reference to FIGS. 5 and 6 embody the additional features of the invention explained in the foregoing. The device of FIG. 6 has the further advantage that the system according to the invention can also be employed as a Miller integration circuit for simple integration. Consequently, this apparatus selectively permits, by switching a single switch 56, to integrate the pickup voltage either once or twice, as may be desired in a particular case.

That is, if in the apparatus according to FIG. 6 the switch 56 is set for connection to resistor 55, then the components 55 and 14' form together a Miller integrator which integrates the magnitude only once. However, when the switch 56 is set for connection with inductance 45 as shown, then the input magnitude $U_1$ applied across terminals 43, 44 is integrated twice as explained above with reference to FIG. 4.

The switch 54' changes the integration constants by selection of one of the capacitors 47, 47b in order to adjust the desired sensitivity state of the measuring device (according to curves 31, 37, 38, 39).

We claim:

1. Dynamic balancing apparatus for rotors, comprising electric transducer means for translating unbalance-responsive oscillations of the rotating rotor into alternating voltage, electric measuring means connected to said transducer for indicating an unbalance magnitude under control by said alternating voltage, and a voltage-integrating resonance circuit interposed between said transducer and said measuring means and having inductance means and capacitance means connected in series with each other across said transducer to be impressed by the transducer voltage, said measuring means being connected across said capacitance means to receive integrated voltage therefrom, said circuit having a resonance frequency below the lowest normal working frequency of the apparatus.

2. In dynamic balancing apparatus according to claim 1, said resonance circuit comprising ohmic resistance corresponding to the circuit attenuation at which said integrated voltage exhibits minimum phase error.

3. In dynamic balancing apparatus according to claim 1, said resonance circuit comprising ohmic resistance corresponding to the circuit attenuation at which said integrated voltage exhibits minimum amplitude error.

4. In dynamic balancing apparatus according to claim 1, said capacitance means comprising control means for varying the effective capacitance value in said circuit to thereby obtain a controlled weakening of said integrated voltage conjointly with a change in said resonance frequency.

5. In dynamic balancing apparatus according to claim 1, said inductance means comprising control means for varying the effective inductivity value in said circuit to thereby obtain a controlled weakening of said integrated voltage conjointly with a change in said resonance frequency.

6. In dynamic balancing apparatus according to claim 1, at least one of said capacitance and inductance means being adjustable for varying the tuned resonance frequency, and said circuit having adjustable ohmic resistance means for varying the attenuation of said circuit for controllable weakening of the integrated voltage simultaneously with a change of said resonance frequency.

7. In dynamic balancing apparatus according to claim 1, said capacitance means of said resonance circuit being constituted by the apparent capacitance of an amplifier of the Miller integrator type.

8. In dynamic balancing apparatus according to claim 1, said capacitance means of said resonance circuit being constituted by the apparent capacitance of an amplifier of the Miller integrator type, and a selector switch having two selective positions, said switch connecting said Miller integrator in series with said inductance means to said transducer for double integration of said alternating voltage when said switch is in one of said two positions, and said switch connecting said Miller integrator with said transducer while disconnecting said inductance means when in the other switch position for single integration of said alternating voltage.

9. Dynamic balancing apparatus for rotors, comprising journalling means for a rotor, drive means for rotating the rotor in said journalling means at a desired testing frequency, electric transducer means mounted at said journalling means for translating unbalance-responsive oscillations of the rotating rotor into alternating voltage, a source of phase-reference voltage under control by said drive means so as to be synchronous with the rotor rotation, measuring means connected to said two voltages for furnishing a measuring value indicative of an unbalance criterion of the rotor, and a voltage-integrating resonance circuit interposed between said transducer and said measuring means and having inductance means and capacitance means connected in series with each other across said transducer to be impressed by the transducer voltage, said measuring means being connected across said capacitance means to receive integrated voltage therefrom, said circuit having a resonance frequency below the lowest value of said testing frequency.

10. Dynamic balancing apparatus for rotors, comprising journalling means for a rotor, drive means for rotating the rotor at a desired testing frequency, electric transducer means mounted at said journalling means for translating unbalance-responsive oscillations of the rotating rotor into alternating voltage, a phase-reference generator coupled with said drive and having a voltage synchronous with the rotor rotation, wattmetric instrument means having two input circuits of which one is connected to said phase-reference generator, an amplifier having an output stage connected to said other input circuit, a voltage integrating network having inductance means and capacitance means connected in series with each other across said transducer to be impressed by the transducer voltage, said amplifier having an input stage connected across said capacitance means to receive integrated voltage therefrom, said network having a resonance frequency below the lowest normal working frequency of the apparatus.

References Cited in the file of this patent

UNITED STATES PATENTS

| | | |
|---|---|---|
| 2,539,618 | Good et al. | Jan. 30, 1951 |
| 2,616,289 | Kleckner | Nov. 4, 1952 |
| 2,695,516 | Petroff | Nov. 30, 1954 |
| 2,731,834 | Fehr et al. | Jan. 24, 1956 |
| 2,799,168 | Federn et al. | July 16, 1957 |

OTHER REFERENCES

Page 56, Elements of Mechanical Vibration by Freberg and Kemler, published by Wiley in 1947.